(12) United States Patent
Nachenberg (10) Patent No.: US 7,130,981 B1
(45) Date of Patent: Oct. 31, 2006

(54) SIGNATURE DRIVEN CACHE EXTENSION FOR STREAM BASED SCANNING

(75) Inventor: Carey Nachenberg, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 232 days.

(21) Appl. No.: 10/819,494

(22) Filed: Apr. 6, 2004

(51) Int. Cl.
*G06F 12/00* (2006.01)

(52) U.S. Cl. .................... 711/170; 711/111
(58) Field of Classification Search ............... 711/170
See application file for complete search history.

(56) References Cited

U.S. PATENT DOCUMENTS

| | | | |
|---|---|---|---|
| 5,398,196 A | 3/1995 | Chambers | |
| 5,452,442 A | 9/1995 | Kephart | |
| 5,495,607 A | 2/1996 | Pisello et al. | |
| 5,572,590 A | 11/1996 | Chess | |
| 5,675,710 A | 10/1997 | Lewis | |
| 5,694,569 A | 12/1997 | Fischer | |
| 5,826,249 A | 10/1998 | Skeirik | |
| 5,832,208 A | 11/1998 | Chen et al. | |
| 5,832,527 A | 11/1998 | Kawaguchi | |
| 5,854,916 A | 12/1998 | Nachenberg | |
| 5,884,033 A | 3/1999 | Duvall et al. | |
| 5,944,821 A | 8/1999 | Angelo | |
| 5,974,549 A | 10/1999 | Golan | |
| 6,006,242 A | 12/1999 | Poole et al. | |
| 6,021,510 A | 2/2000 | Nachenberg | |
| 6,023,723 A | 2/2000 | McCormick et al. | |
| 6,052,709 A | 4/2000 | Paul | |
| 6,072,942 A | 6/2000 | Stockwell et al. | |
| 6,088,803 A | 7/2000 | Tso et al. | |
| 6,092,194 A | 7/2000 | Touboul | |
| 6,094,731 A | 7/2000 | Waldin et al. | |
| 6,125,459 A | 9/2000 | Andoh et al. | |
| 6,161,130 A | 12/2000 | Horvitz et al. | |
| 6,167,434 A | 12/2000 | Pang | |
| 6,253,169 B1 | 6/2001 | Apte et al. | |
| 6,298,351 B1 | 10/2001 | Castelli et al. | |
| 6,347,310 B1 | 2/2002 | Passera | |
| 6,370,526 B1 | 4/2002 | Agrawal et al. | |
| 6,397,200 B1 | 5/2002 | Lynch et al. | |
| 6,397,215 B1 | 5/2002 | Kreulen et al. | |
| 6,401,122 B1 | 6/2002 | Matsui et al. | |
| 6,421,709 B1 | 7/2002 | McCormick et al. | |
| 6,424,960 B1 | 7/2002 | Lee et al. | |
| 6,442,606 B1 | 8/2002 | Subbaroyan et al. | |

(Continued)

FOREIGN PATENT DOCUMENTS

EP  0636977 A2  2/1995

(Continued)

OTHER PUBLICATIONS

Burchell, Jonathan, "NetShield 1.5", Virus Bulletin, Aug. 1994, pp. 21-23, XP 000617453.

(Continued)

*Primary Examiner*—Matthew Kim
*Assistant Examiner*—Lev Iwashko
(74) *Attorney, Agent, or Firm*—Sonnenschein Nath & Rosenthal LLP (57) ABSTRACT

A scanning manager (101) dynamically resizes (205) a flow scanning cache (109) based on signature (105) content in order to scan a flow (103) for signatures (105). The scanning manager (101) reads a directive (107) in a signature (105) to resize (205) the cache (109) in order to scan the flow (103) for the signature (105). The scanning manager (101) dynamically resizes (205) the cache (109) responsive to the directive (107), and scans for the signature (105) within the resized cache (109).

43 Claims, 4 Drawing Sheets

U.S. PATENT DOCUMENTS

| | | |
|---|---|---|
| 6,456,991 B1 | 9/2002 | Srinivasa et al. |
| 6,493,007 B1 | 12/2002 | Pang |
| 6,502,082 B1 | 12/2002 | Toyama et al. |
| 6,505,167 B1 | 1/2003 | Horvitz et al. |
| 6,546,416 B1 | 4/2003 | Kirsch |
| 6,564,318 B1 * | 5/2003 | Gharda et al. .................. 713/2 |
| 6,721,721 B1 | 4/2004 | Bates et al. |
| 6,728,830 B1 * | 4/2004 | Assaf ......................... 711/112 |
| 6,751,789 B1 | 6/2004 | Berry et al. |
| 6,772,346 B1 | 8/2004 | Chess et al. |
| 6,842,861 B1 | 2/2005 | Cox et al. |
| 6,886,099 B1 | 4/2005 | Smithson et al. |
| 6,944,555 B1 | 9/2005 | Blackett et al. |
| 6,952,779 B1 | 10/2005 | Cohen et al. |
| 6,973,578 B1 | 12/2005 | McIchionc |
| 7,024,403 B1 | 4/2006 | Kyler |
| 2002/0035693 A1 | 3/2002 | Eyres et al. |
| 2002/0038308 A1 | 3/2002 | Cappi |
| 2002/0046207 A1 | 4/2002 | Chino et al. |
| 2002/0073046 A1 | 6/2002 | David |
| 2002/0087649 A1 | 7/2002 | Horvitz |
| 2002/0138525 A1 | 9/2002 | Karadimitriou et al. |
| 2002/0147694 A1 | 10/2002 | Dempsey et al. |
| 2002/0147782 A1 | 10/2002 | Dimitrova et al. |
| 2002/0178375 A1 | 11/2002 | Whittaker et al. |
| 2002/0194488 A1 | 12/2002 | Cormack et al. |
| 2002/0194489 A1 | 12/2002 | Almogy et al. |
| 2002/0199186 A1 | 12/2002 | Ali et al. |
| 2002/0199194 A1 | 12/2002 | Ali |
| 2003/0023875 A1 | 1/2003 | Hursey et al. |
| 2003/0033587 A1 | 2/2003 | Ferguson et al. |
| 2003/0061287 A1 | 3/2003 | Yu et al. |
| 2003/0065926 A1 | 4/2003 | Schultz et al. |
| 2003/0110280 A1 | 6/2003 | Hinchliffe et al. |
| 2003/0110393 A1 | 6/2003 | Brock et al. |
| 2003/0110395 A1 | 6/2003 | Presotto et al. |
| 2003/0115458 A1 | 6/2003 | Song |
| 2003/0115479 A1 | 6/2003 | Edwards et al. |
| 2003/0154394 A1 | 8/2003 | Levin |
| 2003/0167402 A1 | 9/2003 | Stolfo et al. |
| 2003/0233352 A1 | 12/2003 | Baker |
| 2004/0015554 A1 | 1/2004 | Wilson |
| 2004/0039921 A1 | 2/2004 | Chuang |
| 2004/0103310 A1 | 5/2004 | Sobel et al. |
| 2004/0117401 A1 | 6/2004 | Miyata et al. |
| 2004/0117641 A1 | 6/2004 | Kennedy et al. |
| 2004/0220975 A1 | 11/2004 | Carpentier et al. |

FOREIGN PATENT DOCUMENTS

| | | |
|---|---|---|
| EP | 1408393 A2 | 4/2004 |
| WO | WO 93/25024 A1 | 12/1993 |
| WO | WO 99/15966 A1 | 4/1999 |
| WO | WO 00/28420 A2 | 5/2000 |
| WO | WO 02/33525 A2 | 4/2002 |

OTHER PUBLICATIONS

Parkhouse, Jayne, "Pelican SafeTNet 2.0", [online] Jun. 2000, SC Magazine Product Review, [retrieved Dec. 1, 2003] Retrieved from the Internet: <URL: http://www.scmagazine.com/standalone/pelican/sc_pelican.html>.

Morar, J.E. and Chess, D.M., "Can Cryptography Prevent Computer Viruses?", Virus Bulletin Conference 2000, Sep. 2000, pp. 127-138, Virus Bulletin Ltd., Oxfordshire, England.

Wikipedia.org web pages [online], Wikipedia, [retrieved Mar. 17, 2003] Retrieved from the Internet: <ULR: http://www.wikipedia.org/w/wiki.phintl?title=machine learning and printable=yes>.

Outlook.spambully.com web pages [online] Spam Bully [retrieved Jan. 16, 2003] Copyright 2002, Retrieved from the Internet <URL: http://outlook.spambully.com/about.php>.

"Enterprise Protection Strategy" [online] Trend Micro Inc. [retrieved Dec. 03, 2002] Retrieved from the Internet: <URL: http://www.trendmicro.com/en/products/eps/features.htm>.

"How to Test Outbreak Commander", :Trend Micro Inc., Aug. 2002, pp. 1-13, Cupertino, CA.

Choi, Yang-Seo, et al., "A New Stack Buffer Overflow Hacking Defense Technique wih Memory Address Confirmation", Lecture Notes in Computer Science 2288, 2002, pp. 146-159, Spinger Verlog, Berlin and Heidelberg, Germany.

Chew, Monica and Dawn Song, "Mitigating Buffer Overflows by Operating System Randomization", Dec. 2000, pp. 1-9, U.C. Berkeley, CA USA.

Bolosky, W., Corbin, S., Goebel, D., and Douceur, J., "Single Instance Storage in Windows 2000", Microsoft Research, Balder Technology Group, Inc., [online] [retrieved Oct. 11, 2002] Retrieved from the Internet <URL: http://research.microsoft.com/sn/farsite/wss2000.pdf>.

Bontchev, Vesselin, "Possible Macro Virus Attacks and How to Prevent Them", Computer & Security, vol. 15, No. 7, pp. 595-626, 1996.

* cited by examiner

SIGNATURE DRIVEN CACHE EXTENSION FOR STREAM BASED SCANNING

TECHNICAL FIELD

This invention pertains generally to computer security, and more specifically to dynamically resizing a flow scanning cache.

BACKGROUND ART

Networked computers are vulnerable to malicious computer code attacks, such as worms, viruses and Trojan horses. As used herein, "malicious computer code" is any code that enters a computer without an authorized user's knowledge and/or without an authorized user's consent.

It is often desirable to scan data before allowing it into a computer or a computer network. Data can contain undesirable content, such as malicious code (e.g. a computer virus). Scanning an inbound data flow for matches to known malicious code signatures prior to allowing it into a computing environment can detect undesirable content, and either block the entry of the data, or modify the data so as to remove the undesirable content. Similarly, scanning an outbound flow of data prior to allowing it to leave a computing environment can detect and process malicious code originating from that organization's computer network.

Existing scanning engines perform both packet and stream-oriented scanning. To detect attacks that span multiple packets (i.e., at the stream level), such scanners must buffer the contents of previous packets in those cases when a signature matches the data within the current packet, but requires more data from subsequent (as-yet unavailable) packets to complete matching.

Therefore, these engines, only when necessary, buffer the contents of previous packets until such time that enough contiguous data is available for a signature to be applied, and either to determine that it has matched or mismatched conclusively.

Given the large number of flows that must be simultaneously processed by a network intrusion detection system (often, 50,000 or more connections must be dealt with simultaneously), the amount of data that can be buffered on behalf of any specific connection/flow is extremely small (typically only a couple of kilobytes). Unfortunately, there are many attacks—specifically buffer overflow attacks—which often require tens of kilobytes of contiguous stream data for identification. Any scanning engine that is incapable of buffering a sufficient amount of data for scanning will be unable to detect such an attack, or at least unable to detect such attacks reliably without a dramatically increased false positive rate. Subsequently, existing scanning engines are incapable of reliably detecting these types of attacks.

What is needed are methods, computer readable media and systems that enable performance-efficient caching of packet data to enable detection of the most complex threats, while minimizing the required amount of memory.

DISCLOSURE OF INVENTION

The present invention comprises methods, systems, and computer readable media for dynamically resizing (205) a flow scanning cache (109) based on signature (105) content in order to scan a flow (103) for signatures (105). In some embodiments, a scanning manager (101) reads a directive (107) in a signature (105) to resize (205) the flow scanning cache (109) in order to scan the flow (103) for the signature (105). The scanning manager (101) dynamically resizes (205) the flow scanning cache (109) responsive to the directive (107), and scans for the signature (105) within the resized flow scanning cache (109).

In other embodiments, prior to scanning at least one flow (103), the scanning manager (101) reads (301) a plurality of signatures (105), and determines (303) from content of at least one signature (105) an optimal flow scanning cache (109) size for scanning for that signature (105). While scanning a flow (103) for the plurality of signatures (105), the scanning manager (101) dynamically resizes (307) the flow scanning cache (109) based on the determined optimal flow scanning cache (109) size for at least one signature of the plurality, as the scanning manager (101) is scanning for that signature (105).

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
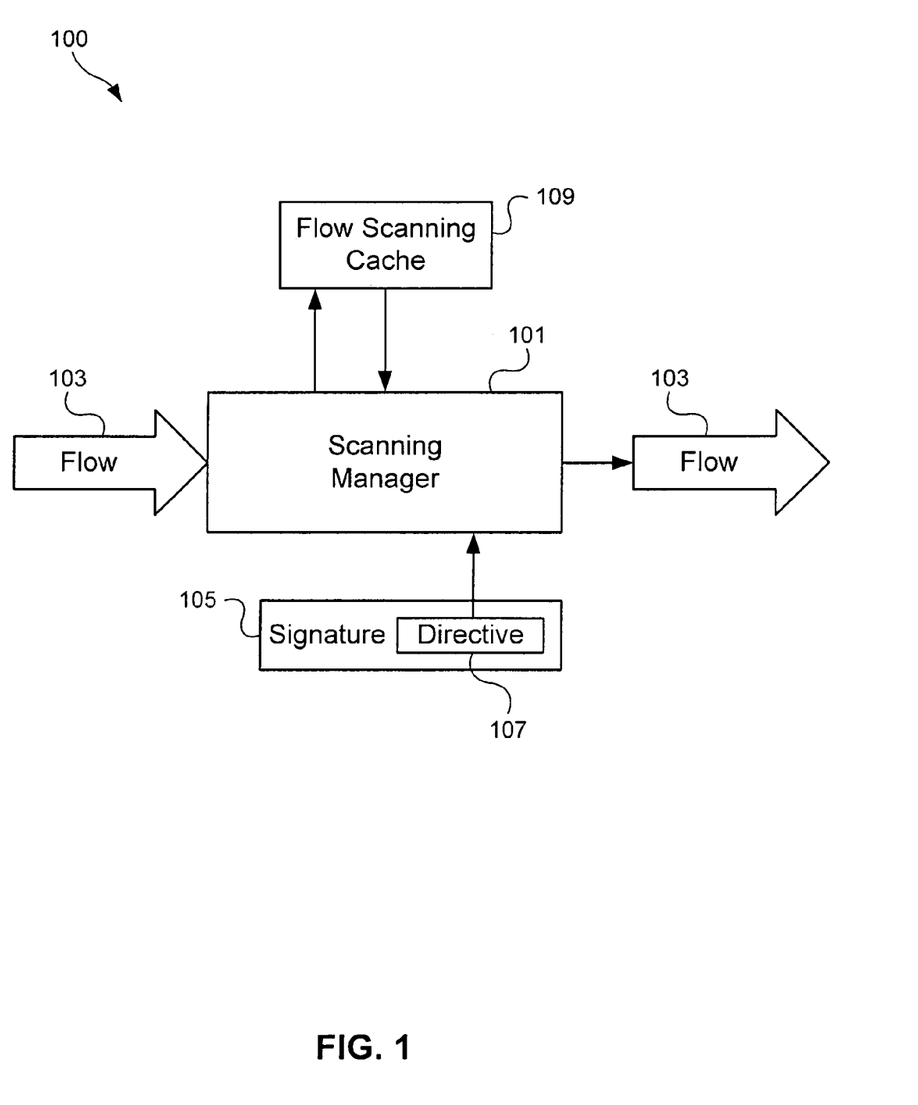
FIG. 1 is a block diagram illustrating a high level overview of a system for practicing some embodiments of the present invention.

FIG. 1 illustrates a high level overview of a system 100 for performing some embodiments of the present invention. A scanning manager 101 scans a flow 103 for matches of known malicious code signatures 105.

It is to be understood that although the scanning manager 101 is illustrated as a single entity, as the term is used herein a scanning manager 101 refers to a collection of functionalities which can be implemented as software, hardware, firmware or any combination of the three. Where a scanning manager 101 is implemented as software, it can be implemented as a standalone program, but can also be implemented in other ways, for example as part of a larger program, as a plurality of separate programs, or as one or more statically or dynamically linked libraries.

In some embodiments the scanning manager 101 is incorporated into a router and/or one or more switch(es). In other embodiments, the scanning manager 101 is incorporated into other components as desired, for example a firewall, a network card embedded client firewall, an intrusion prevention system, an intrusion detection system, an intrusion detection system application proxy, a router, a switch, a standalone proxy, a server, a gateway and/or a client computer. In some embodiments, the scanning manager 101 is distributed between more than one of the above and/or other components.

It is to be understood that although FIG. 1 illustrates only a single flow 103 for the purpose of visual clarity, typically a scanning manager 101 scans many flows 103 simultaneously. Additionally, although FIG. 1 illustrates only a single signature 105 for purposes of visual clarity, a scanning manager 101 typically attempts to match content of a flow 103 with many different known malicious code signatures 105. Scanning multiple flows 103 for multiple malicious code signatures 105 is known to those of ordinary skill in the relevant art, and their application within the context of the present invention will be readily apparent to such ordinarily skilled artisans, in light of this specification.

In the present invention, signatures 105 can contain directives 107 to the scanning manager 101 to resize an associated flow scanning cache 109 as desired. Such directives 107 can be embedded within any type of signature 105, such as regular expression signatures 105, P-CODE signatures 105, etc. The scanning manager 101 contains accompanying support logic to properly interpret the directives 107 and resize the cache 109 for a particular flow 103 as desired.

For example, consider a traditional signature 105 consisting of the text:

ABCDEFG.*GHIJKLM.*NOPQRST

As understood by those of ordinary skill in the prior art, this signature 105 would cause a traditional scanning engine to attempt to match the string ABCDEFG in a packet. If the engine finds a match, it would then skip an arbitrary number of bytes (potentially advancing to subsequent packets to continue matching), looking for the string GHIJKLM. If the second string is subsequently located, the engine would then skip an arbitrary number of bytes looking for NOPQRST. In a traditional system, such a signature 105 would only be able to match stream data that fit within the system's flow buffer. For example, if the flow buffer were 256 bytes, unless all three sub-strings occurred within a contiguous 256-byte portion of the stream, matching against the signature 105 would fail to detect the attack.

In some embodiments of the present invention, a directive 107 can be a keyword or token inserted into the signature 105. For example, the signature 105 shown above could include a directive 107 as follows:

ABCDEFG<cachesize(4000)>.*GHIJKLM.*NOPQRST

When processing this updated signature 105, the scanning manager 101 will attempt to match the characters ABCDEFG in the flow 103. If and only if the scanning manager 101 is able to locate this first portion of the string (ABCDEFG), then the scanning manager 101 will process the directive 107 by dynamically expanding the cache 109 size for the current flow 103 from its default size (e.g., 256 bytes) to 4000 bytes. This will then enable the scanning manager 101 to buffer up to four kilobytes instead of the base 256 bytes, and enable matching of the subsequent sub-strings of the signature 105 anywhere within a contiguous four kilobyte region of the current flow 103. Note that in the example given, the "cachesize" directive 107 is processed only when the first part of the signature 105 matches, ensuring that the flow's 103 cache 109 is not expanded unnecessarily. The assumption is that the first part of the signature 105 (e.g., ABCDEFG) will occur infrequently enough in legitimate network traffic to limit the frequency of cache 109 expansion. This therefore limits the overall memory consumption, but provides needed buffering when required.

In another embodiment, the directive 107 can be included in the signature 105 as:

ABCDEFG.*GHIJKLM<cachesize(4000)>.*NOPQRST

This example of the signature 105 would cause the scanning manager 101 to search for the ABCDEFG and GHIJKLM substrings within the existing default sized cache 109 before dynamically expanding the cache 109 size to 4000 bytes and looking for the remainder of the string. Such a signature 105 would limit even further the likelihood that the cache 109 would be expanded, saving memory, since both sub-strings would need to be found before cache 109 expansion would take place.

Where within a signature 105 to place a directive 107 is a variable design choice. All possibilities are within the scope of the present invention. Of course, the example format of the directives 107 shown above is illustrative only. Many formats are possible, will be apparent to those of ordinary skill in the relevant art in light of this specification, and are within the scope of the present invention.

Figure 2:
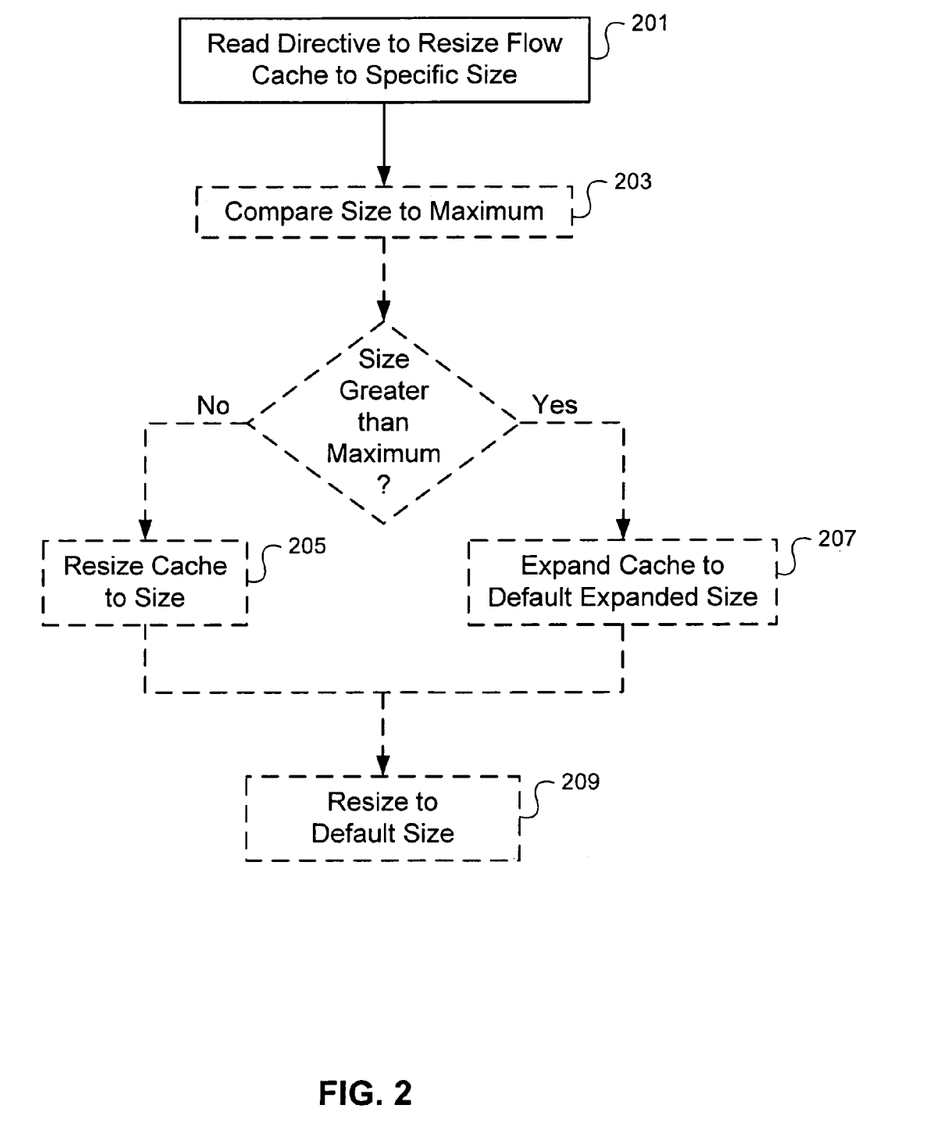
FIG. 2 is a flowchart illustrating steps for the scanning manager to process a directive to dynamically resize the cache, according to some embodiments of the present invention.

FIG. 2 illustrates steps for the scanning manager 101 to process a directive 107 to dynamically resize the cache 109 according to some embodiments of the present invention. The scanning manager 101 reads 201 a directive 107 in a signature 105 to resize the flow scanning cache 109. In some embodiments of the present invention, the directive 107 in the signature 105 specifies a specific number of bytes to which to resize the flow scanning cache 109 (e.g., 4000). In some such embodiments, the scanning manager 101 compares 203 the size specified by the directive 107 to a maximum cache 109 size (e.g., one megabyte; the specific maximum to use is a variable design choice). If the specified size exceeds the maximum, the scanning manager 101 can dynamically expand 207 the cache 109 size to a default expanded size (e.g., the maximum), or abort (not illustrated) the scanning for that particular signature 105 with an error condition. Where the specified size does not exceed the maximum (and in embodiments in which the scanning manager 101 does not perform such a check), the scanning manager 101 dynamically resizes 205 the cache 109 to the specified size. Note that this can consist of expanding or contracting the cache 109, depending upon its size prior to the processing of the directive 107. Under some circumstances, the cache 109 might already be the specified size, in which case the scanning manager 101 simply ignores (not illustrated) the directive 107. This can occur where multiple signatures 105 each attempt to resize the cache 109 to the same size. In other embodiments, the scanning manager 101 determines not whether the cache 109 is the exact size specified by the directive 107, but instead whether the cache is sufficiently sized as per the directive (i.e., as large or larger than the directive 107 specifies). In such embodiments, only where the cache 109 is not sufficiently sized does the scanning manager 101 execute the resizing.

In some embodiments, directives 107 can specify to resize the cache 109 without providing an exact size. In such embodiments, the scanning manager 101 can dynamically resize 205 the cache 109 to a default expanded cache 109 size (e.g., 4000 bytes), in response to the directive 107 not specifying an exact size.

In other embodiments, directives 107 can specify to resize the cache 109 to a size relative to its current size (e.g., add 400 bytes), without providing an exact size. In such embodiments, the scanning manager 101 can dynamically resize 205 the cache 109 to the relative size by adding or subtracting the specified value to or from the current cache 109 size.

In some embodiments, the scanning manager 101 dynamically resizes 209 the flow scanning cache 109 after scanning for the signature 105 within the resized cache 109, for example to a default size (e.g., 256 bytes).

The implementation mechanics of dynamically resizing the cache 109 will be readily apparent to those of ordinary skill in the relevant art in light of this specification. For example, the scanning manager 101 can reallocate a new cache 109 buffer, and copy the contents of the existing cache 109 for the current flow 103 to the new cache 109 buffer. The scanning manager 101 can then free, if necessary, the memory allocated for the previous cache 109 buffer.

In other embodiments of the present invention, instead of explicitly embedding a directive 107 within a signature 105, the scanning manager 101 can in many cases determine the optimal cache 109 for a signature 105 automatically, based on the content of the signature 105. Such an approach works for signatures 105 which have explicit length-matching characteristics. For example, consider the signature 105:

ABCDEFG.{1000,1100}GHIJKLM.{2000, 2006}NOPQRST

The above signature 105 will cause the scanning manager 101 to match ABCDEFG within a stream, then skip between 1000 and 1100 bytes looking for GHIJKLM. If the second substring is found, then the scanning manager 101 will skip between 2000 and 2006 bytes looking for NOPQRST. Thus, the scanning manager 101 optimally would utilize 1100+2006 bytes of cache 109 to scan for the above signature 105.

Furthermore, the scanning manager 101 can automatically expand the cache 109 dynamically once each substring of the signature 105 matched. For example, if scanning manager 101 found ABCDEFG in the stream, it could automatically increase the cache 109 size to 1100 and continue matching and buffering new packets. Subsequently, if the scanning manager 101 found GHIJKLM within the next 1100 bytes, it could automatically increase the cache 109 size to 3106 (e.g. 1100+2006) and then continue matching and buffering new packets.

Embodiments employing such a technique do not require that a signature 105 author explicitly embed a directive 107 within the signature 105. On the other hand, these embodiments are not appropriate for signatures 105 that use regular-expression functionality such as *'s ?'s and +'s, which are open-ended matching primitives. Consider the signature 105:

ABCDEFG.*GHIJKLM.*NOPQRST

The scanning manager 101 could not determine to what size to increase the cache 109, based upon the signature's 105 content. Thus, for signatures 105 that use regular-expression functionality, embodiments including directives 107 are appropriate.

Figure 3:
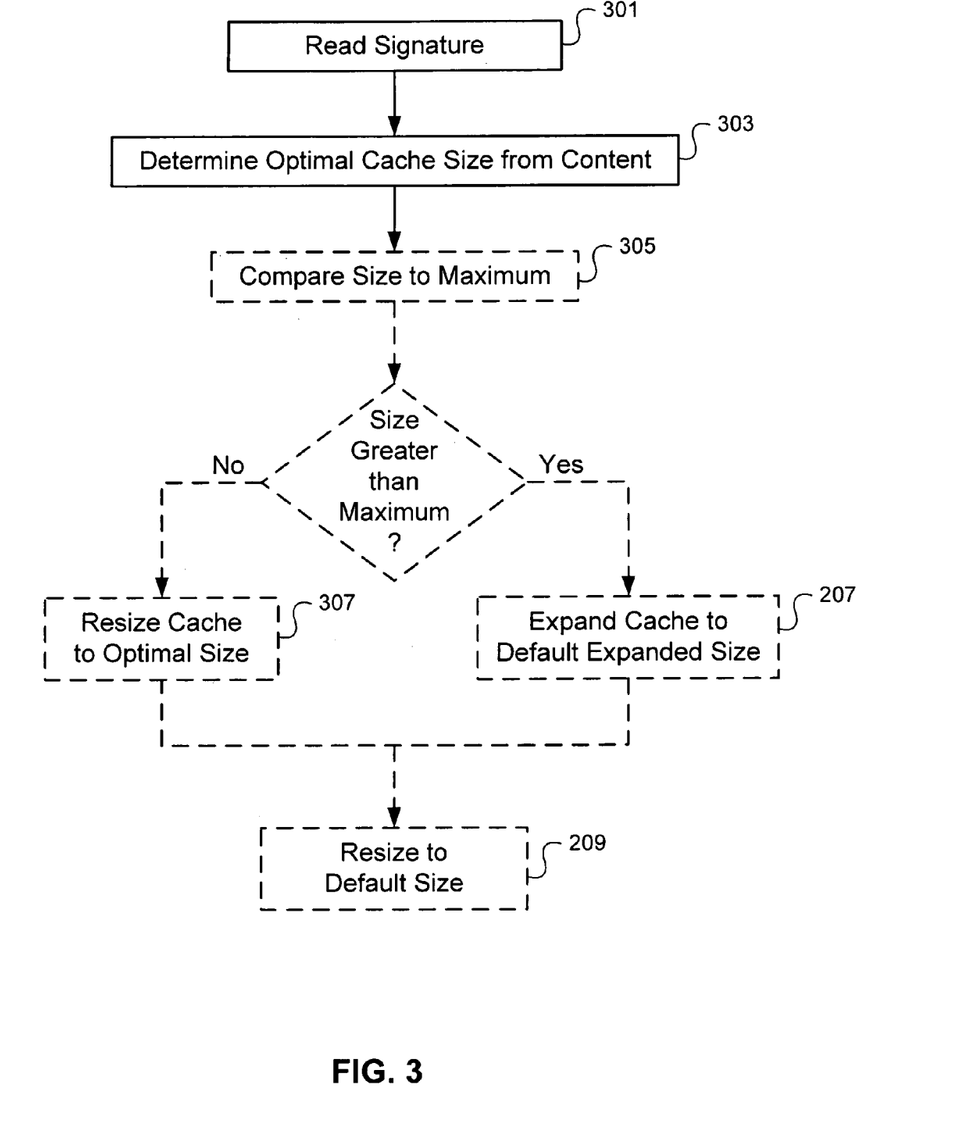
FIG. 3 is a flowchart illustrating steps for the scanning manager to resize the cache based upon signature content, according to some embodiments of the present invention.

FIG. 3 illustrates steps for the scanning manager 101 to resize the cache 109 based upon signature 105 content, according to some embodiments of the present invention. Prior to scanning at least one flow 103, the scanning manager 101 reads 301 a plurality of signatures 105, and determines 303 an optimal flow scanning cache 109 size for at least one signature 105 of the plurality, based on its content as described above.

In some such embodiments, the scanning manager 101 compares 305 the determined optimal size to a maximum cache 109 size (e.g., one megabyte). If the determined size exceeds the maximum, the scanning manager 101 can dynamically expand 207 the cache 109 size to a default expanded size (e.g., the maximum), or abort (not illustrated) the scanning for that particular signature 105 with an error condition. Where the determined optimal size does not exceed the maximum (and in embodiments in which the scanning manager 101 does not perform such a check), the scanning manager 101 dynamically resizes 307 the cache 109 to the determined optimal size.

Under some circumstances, the cache 109 might already be the determined optimal size, in which case the scanning manager 101 simply scans (not illustrated) for the signature 105 without resizing the cache 109. As explained in conjunction with FIG. 2, in some embodiments the scanning manager 101 dynamically resizes 209 the flow scanning cache 109 after scanning for the signature 105 within the resized cache 109, for example to a default size (e.g., 256 bytes). In other embodiments, as described above the scanning manager 101 determines not whether the cache 109 is the exact size specified by the directive 107, but instead whether the cache is sufficiently sized.

Figure 4:
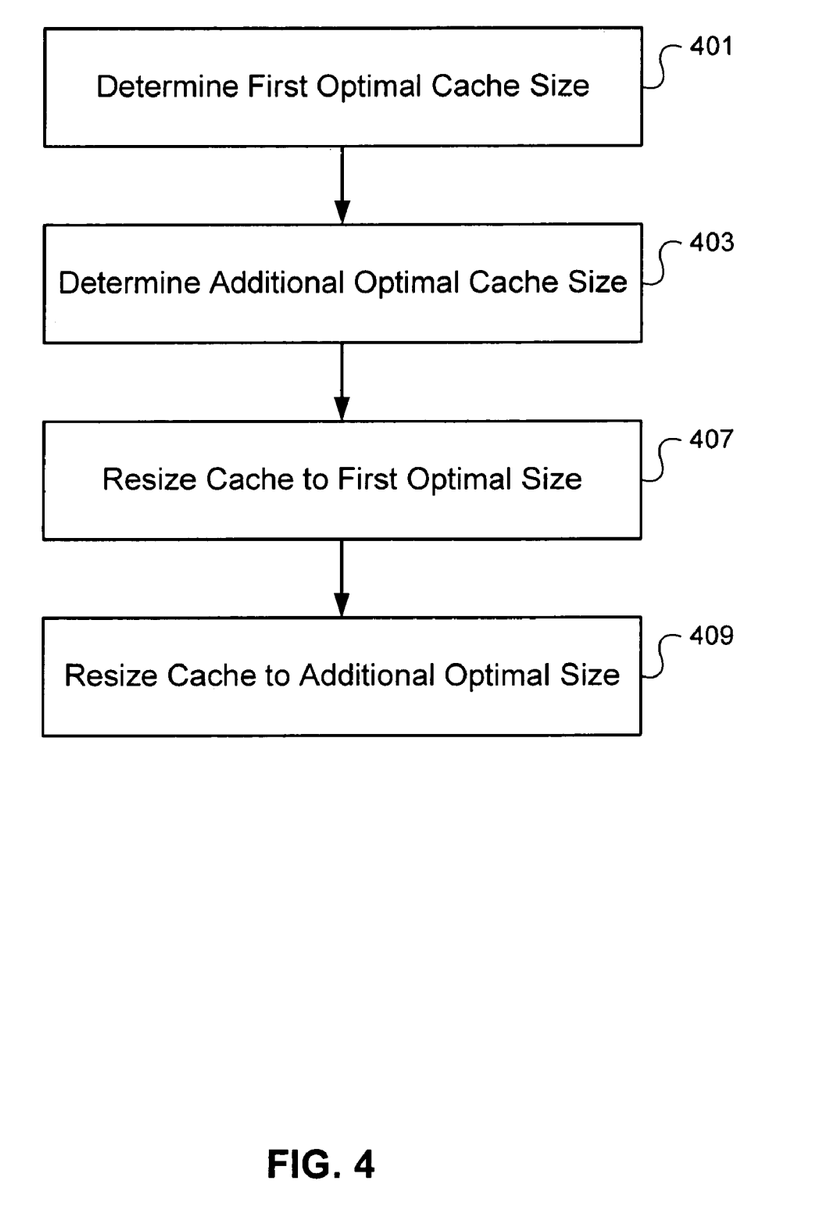
FIG. 4 is a flowchart illustrating steps for the scanning manager to determine and utilize a first and at least one additional optimal cache size, according to some embodiments of the present invention.

Turning now to FIG. 4, as explained above, in some embodiments the scanning manager 101 determines 401 a first optimal cache 109 size for scanning for a first portion of at least one signature 105, and determines 403 at least one additional optimal cache 109 size for scanning for at least one additional portion of that at least one signature 105. In such instances, the scanning manager 101 dynamically resizes 405 the cache 109 to the first determined optimal size while scanning for the first portion of the signature 105, and dynamically resizes 407 the cache 109 to at least one additional determined optimal size while scanning for at least one additional portion of the signature 105.

Embodiments including directives 107 and embodiments in which the scanning manager 101 determines optimal cache 109 size from signature 105 content both allow the scanning manager 101 to dynamically resize the cache 109 on a per-flow 103 basis, and thus enable the scanning manager 101 to obtain significantly more context in a granular fashion. This context is very advantageous for detecting the extremely complex attacks, detecting attacks such as buffer overflows generically, etc.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for dynamically resizing a flow scanning cache used to scan a flow for presence of malicious code signatures, the method comprising the steps of:
   a scanning manager reading a directive contained within a known malicious code signature, said directive instructing the scanning manager to resize the flow scanning cache;
   the scanning manager dynamically resizing the flow scanning cache responsive to the directive;
   and the scanning manager scanning for presence of a known malicious code signature within the resized flow scanning cache.

2. The method of claim 1 wherein the step of the scanning manager dynamically resizing the flow scanning cache comprises: the scanning manager dynamically expanding the flow scanning cache to a specific size, in response to the directive contained within the known malicious code signature.

3. The method of claim 2 further comprising the steps of:
   the scanning manager comparing the specific size specified by the directive to a maximum flow scanning cache size;
   and responsive to determining that the specified size is greater than the maximum flow scanning cache size, the scanning manager performing a step from a group of steps consisting of:
   the scanning manager dynamically expanding the flow scanning cache to a default expanded size;
   and the scanning manager classifying the result of the determination as an error condition.

4. The method of claim 1 wherein the step of the scanning manager dynamically resizing the flow scanning cache comprises: the scanning manager dynamically resizing the flow scanning cache to a default expanded cache size, in response to the directive contained within the known malicious code signature not specifying a specific number of bytes.

5. The method of claim 1 wherein the step of the scanning manager dynamically resizing the flow scanning cache comprises: the scanning manager dynamically contracting the flow scanning cache to a specific size, in response to the directive contained within the known malicious code signature.

6. The method of claim 1 further comprising the steps of:
   the scanning manager reading the directive;
   the scanning manager determining that the flow scanning cache is already sized sufficiently as per the directive;
   and the scanning manager ignoring the directive.

7. The method of claim 1 further comprising the step of: the scanning manager dynamically resizing the flow scanning cache, after scanning for the known malicious code signature within the resized flow scanning cache.

8. The method of claim 7 wherein the step of the scanning manager dynamically resizing the flow scanning cache comprises: the scanning manager dynamically contracting the flow scanning cache to a default size.

9. The method of claim 1 wherein the steps are performed by a scanning manager which is incorporated into at least one of the following:
   a firewall;
   a network card embedded client firewall;
   an intrusion prevention system;
   an intrusion detection system;
   an intrusion detection system application proxy;
   a router;
   a switch;
   a standalone proxy;
   a server;
   a gateway;
   a client.

10. A computer implemented method for dynamically resizing a flow scanning cache used to scan at least one flow for presence of malicious code signatures, the method comprising the steps of:
    prior to scanning at least one flow, a scanning manager reading a plurality of known malicious code signatures;
    the scanning manager determining from content of at least one known malicious code signature an optimal flow scanning cache size for scanning for that malicious code signature;
    and while scanning a flow for the plurality of known malicious code signatures, the scanning manager dynamically resizing the flow scanning cache based on the determined optimal flow scanning cache size for at least one known malicious code signature of the plurality, as the scanning manager is scanning for that known malicious code signature.

11. The method of claim 10 wherein the step of the scanning manager dynamically resizing the flow scanning cache comprises: the scanning manager dynamically expanding the flow scanning cache to the determined optimal size for a specific known malicious code signature.

12. The method of claim 11 further comprising the steps of:
    the scanning manager comparing the determined optimal size for a specific known malicious code signature to a maximum flow scanning cache size; and
    responsive to determining that the size is greater than the maximum flow scanning cache size, the scanning manager performing a step from a group of steps consisting of:
    the scanning manager dynamically expanding the flow scanning cache to a default expanded size; and
    the scanning manager classifying the result of the determination as an error condition.

13. The method of claim 10 wherein the step of the scanning manager dynamically resizing the flow scanning cache comprises: the scanning manager dynamically contracting the flow scanning cache to the determined optimal size for a specific known malicious code signature.

14. The method of claim 10 further comprising the steps of:
    the scanning manager determining that the flow scanning cache is already sufficiently sized as per the determined optimal size for a specific known malicious code signature;
    and the scanning manager scanning for that known malicious code signature without resizing the flow scanning cache.

15. The method of claim 10 further comprising the step of:
    the scanning manager dynamically resizing the flow scanning cache, after scanning for a known malicious code signature within the resized flow scanning cache.

16. The method of claim 15 wherein the step of the scanning manager dynamically resizing the flow scanning cache comprises:
    the scanning manager dynamically contracting the flow scanning cache to a default size.

17. The method of claim 10 wherein:
    the step of the scanning manager determining an optimal flow scanning cache size for scanning at least one known malicious code signature further comprises:

the scanning manager determining a first optimal flow scanning cache size for scanning for a first portion of the at least one known malicious code signature; and the scanning manager determining at least one additional optimal flow scanning cache size for scanning for at least one additional portion of that at least one known malicious code signature;

and wherein the step of the scanning manager dynamically resizing the flow scanning cache based on the determined optimal flow scanning cache size as the scanning manager is scanning for the at least one known malicious code signature further comprises:

the scanning manager dynamically-resizing the flow scanning cache to the first determined optimal size as the scanning manager is scanning for the first portion of the at least one known malicious code signature; and the scanning manager dynamically resizing the flow scanning cache to at least one additional optimal size as the scanning manager is scanning for at least one additional portion of that at least one known malicious code signature.

18. The method of claim 10 wherein the steps are performed by a scanning manager which is incorporated into at least one of the following:
a firewall;
a network card embedded client firewall;
an intrusion prevention system;
an intrusion detection system;
an intrusion detection system application proxy;
a router;
a switch;
a standalone proxy;
a server;
a gateway;
a client.

19. A computer readable medium storing a computer program product for dynamically resizing a flow scanning cache used to scan a flow for presence of malicious code signatures, the computer program product comprising:

program code, acting as a scanning manager, for reading a directive in contained within a known malicious code signature, said directive instructing to resize the flow scanning cache;

program code, acting as a scanning manager, for dynamically resizing the flow scanning cache responsive to the directive;

and program code, acting as a scanning manager, for scanning for the known malicious code signature within the resized flow scanning cache.

20. The computer program product of claim 19 wherein the program code for dynamically resizing the flow scanning cache comprises: program code for dynamically expanding the flow scanning cache to a specific size, in response to the directive contained within the known malicious code signature.

21. The computer program product of claim 20 further comprising:
program code for comparing the specific size specified by the directive to a maximum flow scanning cache size; and
program code for, responsive to determining that the specified size is greater than the maximum flow scanning cache size, performing a step from a group of steps consisting of:
dynamically expanding the flow scanning cache to a default expanded size; and classifying the result of the determination as an error condition.

22. The computer program product of claim 19 wherein the program code for dynamically resizing the flow scanning cache comprises: program code for dynamically resizing the flow scanning cache to a default expanded cache size, in response to the directive not specifying a specific number of bytes.

23. The computer program product of claim 19 further comprising: program code for dynamically contracting the flow scanning cache to a default size, after scanning for the known malicious code signature within the resized flow scanning cache.

24. A computer readable medium storing a computer program product for dynamically resizing a flow scanning cache used to scan at least one flow for presence of malicious code signatures, the computer program product comprising:

program code, acting as a scanning manager, for, prior to scanning at least one flow, reading a plurality of known malicious code signatures;

program code, acting as a scanning manager, for determining from content of at least one known malicious code signature an optimal flow scanning cache size for scanning for that known malicious code signature;

and program code, acting as a scanning manager, for, while scanning a flow for the plurality of known malicious code signatures, dynamically resizing the flow scanning cache based on the determined optimal flow scanning cache size for at least one known malicious code signature of the plurality, as the program code is scanning for that known malicious code signature.

25. The computer program product of claim 24 wherein the program code for dynamically resizing the flow scanning cache comprises: program code for dynamically expanding the flow scanning cache to the determined optimal size for a specific known malicious code signature.

26. The computer program product of claim 25 further comprising:
program code for comparing the determined optimal size for a specific known malicious code signature to a maximum flow scanning cache size;
and program code for, responsive to determining that the size is greater than the maximum flow scanning cache size, performing a step from a group of steps consisting of:
dynamically expanding the flow scanning cache to a default expanded size;
and classifying the result of the determination as an error condition.

27. The computer program product of claim 24 further comprising: program code for dynamically contracting the flow scanning cache to a default size, after scanning for a known malicious code signature within the resized flow scanning cache.

28. The computer program product of claim 24 wherein:
the program code for determining an optimal flow scanning cache size for scanning for at least one known malicious code signature further comprises:
program code for determining a first optimal flow scanning cache size for scanning for a first portion of the at least one known malicious code signature; and
program code for determining at least one additional optimal flow scanning cache size for scanning for at least one additional portion of that at least one known malicious code signature;

and wherein the program code for dynamically resizing the flow scanning cache based on the determined optimal flow scanning cache size as program code is scanning for the at least one known malicious code signature further comprises:
program code for dynamically resizing the flow scanning cache to the first determined optimal size as program code for is scanning for the first portion of the at least one known malicious code signature; and
program code for dynamically resizing the flow scanning cache to at least one additional optimal size as program code for is scanning for at least one additional portion of that at least one known malicious code signature.

29. A computer system for dynamically resizing a flow scanning cache used to scan a flow for known malicious code signatures, the computer system comprising:
a software portion, acting as a scanning manager, configured to read a directive in a known malicious code signature to resize the flow scanning a cache in order to scan the flow for the known malicious code signature;
a software portion, acting as a scanning manager, configured to dynamically resize the flow scanning cache responsive to the directive;
and a software portion, acting as a scanning manager, configured to scan for the known malicious code signature within the resized flow scanning cache.

30. The computer system of claim 29 wherein the software portion configured to dynamically resize the flow scanning cache comprises: a software portion configured to dynamically expand the flow scanning cache to a specific size, in response to the directive in the known malicious code signature.

31. The computer system of claim 30 further comprising:
a software portion configured to compare the specific size specified by the directive to a maximum flow scanning cache size;
and a software portion configured to, responsive to determining that the specified size is greater than the maximum flow scanning cache size, perform a step from a group of steps consisting of:
dynamically expanding the flow scanning cache to a default expanded size;
and classifying the result of the determination as an error condition.

32. The computer system of claim 29 wherein the software portion configured to dynamically resize the flow scanning cache comprises: a software portion configured to dynamically resize the flow scanning cache to a default expanded cache size, in response to the directive in the known malicious code signature not specifying a specific number of bytes.

33. The computer system of claim 29 further comprising:
a software portion configured to dynamically contract the flow scanning cache to a default size, after scanning for the known malicious code signature within the resized flow scanning cache.

34. The computer system of claim 29 wherein the software portions are incorporated into at least one of the following: a firewall;
a network card embedded client firewall;
an intrusion prevention system;
an intrusion detection system;
an intrusion detection system application proxy;
a router;
a switch;
a standalone proxy;
a server;
a gateway;
a client.

35. A computer system for dynamically resizing a flow scanning cache used to scan at least one flow for presence of malicious code signatures, the computer system comprising:
a software portion, acting as a scanning manager, configured to, prior to scanning at least one flow, read a plurality of known malicious code signatures;
a software portion, acting as a scanning manager, configured to determine from content of at least one known malicious code signature an optimal flow scanning cache size for scanning for that known malicious code signature;
and a software portion, acting as a scanning manager, configured to, while scanning a flow for the plurality of known malicious code signatures, dynamically resize the flow scanning cache based on the determined optimal flow scanning cache size for at least one known malicious code signature of the plurality, as the software portion is scanning for that known malicious code signature.

36. The computer system of claim 35 wherein the software portion configured to dynamically resize the flow scanning cache comprises: a software portion configured to dynamically expand the flow scanning cache to the determined optimal size for a specific known malicious code signature.

37. The computer system of claim 36 further comprising:
a software portion configured to compare the determined optimal size for a specific known malicious code signature to a maximum flow scanning cache size;
and a software portion configured to, responsive to determining that the size is greater than the maximum flow scanning cache size, perform a step from a group of steps consisting of dynamically expanding the flow scanning cache to a default expanded size;
and classifying the result of the determination as an error condition.

38. The computer system of claim 35 further comprising:
a software portion configured to dynamically contract the flow scanning cache to a default size, after scanning for a known malicious code signature within the resized flow scanning cache.

39. The computer system of claim 35 wherein:
the software portion configured to determine an optimal flow scanning cache size for scanning for at least one known malicious code signature further comprises:
a software portion configured to determine a first optimal flow scanning cache size for scanning for a first portion of the at least one known malicious code signature; and
a software portion configured to determine at least one additional optimal flow scanning cache size for scanning for at least one additional portion of that at least one known malicious code signature;
and wherein the software portion configured to dynamically resize the flow scanning cache based on the determined optimal flow scanning cache size as a software portion is scanning for the at least one known malicious code signature further comprises:
a software portion configured to dynamically resize the flow scanning cache to the first determined optimal size as a software portion is scanning for the first portion of the at least one known malicious code signature; and a software portion configured to dynamically resize the flow scanning cache to at least one additional optimal size as a software portion is scanning for at least one additional portion of that at least one known malicious code signature.

40. The computer system of claim 35 wherein the software portions are incorporated into at least one of the following:
- a firewall;
- a network card embedded client firewall;
- an intrusion prevention system;
- an intrusion detection system;
- an intrusion detection system application proxy;
- a router;
- a switch;
- a standalone proxy;
- a server;
- a gateway;
- a client.

41. The method of claim 1 further comprising the steps of: the scanning manager reading a directive contained within a known malicious code signature, said signature instructing the scanning manager to dynamically resize the flow scanning cache; the scanning manager determining that the flow scanning cache is already sized as per the directive; and the scanning manager ignoring the directive.

42. The method of claim 1 wherein the step of the scanning manager dynamically resizing the flow scanning cache comprises: the scanning manager dynamically resizing the flow scanning cache to a relative size, in response to the directive.

43. The method of claim 10 further comprising the steps of: the scanning manager determining that the flow scanning cache is already sized as per the determined optimal size for a specific known malicious code signature; and the scanning manager scanning for that known malicious code signature without resizing the flow scanning cache.

* * * * *